United States Patent
Zheng et al.

(10) Patent No.: US 10,931,594 B2
(45) Date of Patent: Feb. 23, 2021

(54) INTELLIGENT SOLUTION TO SUPPORT THE UNIFIED DISTRIBUTED REAL-TIME QUOTA LIMITATION

(71) Applicant: EMC IP Holding Company LLC, Hopkinton, MA (US)

(72) Inventors: QingXiao Zheng, ChengDu (CN); Yi Wang, ChengDu (CN); JingRong Zhao, ChengDu (CN); LanJun Liao, ChengDu (CN); Haitao Li, ChengDu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 87 days.

(21) Appl. No.: 16/115,185

(22) Filed: Aug. 28, 2018

(65) Prior Publication Data

US 2020/0044983 A1    Feb. 6, 2020

(30) Foreign Application Priority Data

Aug. 3, 2018    (CN) .......................... 201810880060.5

(51) Int. Cl.
*H04L 12/911* (2013.01)
*H04L 29/08* (2006.01)
*H04L 12/927* (2013.01)

(52) U.S. Cl.
CPC .......... *H04L 47/788* (2013.01); *H04L 47/783* (2013.01); *H04L 47/801* (2013.01); *H04L 67/1095* (2013.01)

(58) Field of Classification Search
None
See application file for complete search history.

(56) References Cited

U.S. PATENT DOCUMENTS

2014/0068624 A1\* 3/2014 Fuller .................. G06F 9/5011
                                                              718/104
2018/0287898 A1\* 10/2018 Bellini, III .......... H04L 41/5096

\* cited by examiner

*Primary Examiner* — Kouroush Mohebbi
(74) *Attorney, Agent, or Firm* — Womble Bond Dickinson (US) LLP

(57) ABSTRACT

A unified distributed real-time quota limitation system limits use of shared networked resources in distributed networked environment (DNE). A dispatch center determines an amount of shared resources available to client devices in the DNE. The dispatch center determines an amount of the shared resources to allocate for use by the clients, and sends the clients one or more policies having a resource usage quota that limits the amount of the resource that the client can use. When a client receives a request to perform a task that requires a shared resource, before running the task, the client determines its own usage of the resource and terminates the task if running the task will exceed the quota limit of the shared resource.

16 Claims, 8 Drawing Sheets

INTELLIGENT SOLUTION TO SUPPORT THE UNIFIED DISTRIBUTED REAL-TIME QUOTA LIMITATION

RELATED APPLICATIONS

This Application claims priority, under 35 U.S.C. § 119, of China Patent Application 201810880060.5 filed on Aug. 3, 2018 and entitled "AN INTELLIGENT SOLUTION TO SUPPORT THE UNIFIED DISTRIBUTED REAL-TIME QUOTA LIMITATION," to Qingxiao Zheng et al.

TECHNICAL FIELD

This disclosure relates to resource monitoring and limiting in a networked environment.

BACKGROUND

A distributed networked system includes one or more client devices and one or more server devices interconnected via a network. In a distributed networked system, client devices may consume resources of one or more server resources on the distributed network as shared, or allocated, resources. Shareable resources of a distributed networked system are resources of the distributed networked system, typically distinguished from client device resources used solely for client device work. A problem that exists in distributed networked systems ("system") is that shareable resources may be over-used by one or more client devices, causing degradation of the performance of the distributed networked system.

To prevent over-utilization of resources, some systems implement resource quotas to limit the amount of a shareable resource that a client may use. Resource quota systems of the prior art are managed by a server system attached to the network. A resource quota may be set manually for each client device and server device. As a client device uses a shared resource, the client device can notify one or more servers as to the amount of shared resource that is being used, or will be used, to perform a task on behalf of the client.

There are at least three problems with existing distributed networked system resource quota limitation systems. First, when shareable resource usage is monitored by a server in the distributed networked system, the server receives update messages from a client device amount of a system resource that is being be used by the client device, such as an amount of network bandwidth or disk storage. This method monitoring shareable resources is unreliable for at least the reason that the shareable resource is typically already being used by the time that a server receives a message that the client device will use the shareable resource. Second, if the server determines that the client device has exceeded its quota of a shareable resource, then the server sends a message to the client device to stop the process that has exceeded its quota limit of that shareable resource. Due to messaging latency, the client device may continue to use more than its allotted quota of the shareable resource until the client device receives, and acts upon, the over-quota limit message sent by the server. Third, there is not currently a way to determine, by the client device, before the client device actually uses the shareable resource, that the client device will use more than its allowed quota limit of a system resource, and to stop the client process before it uses any of the shareable resource if the client process will exceed the quota.

In addition, some shareable resources are not typically monitored in a distributed networked system, e.g. network bandwidth, and some shareable resources cannot be monitored by a client device at all.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
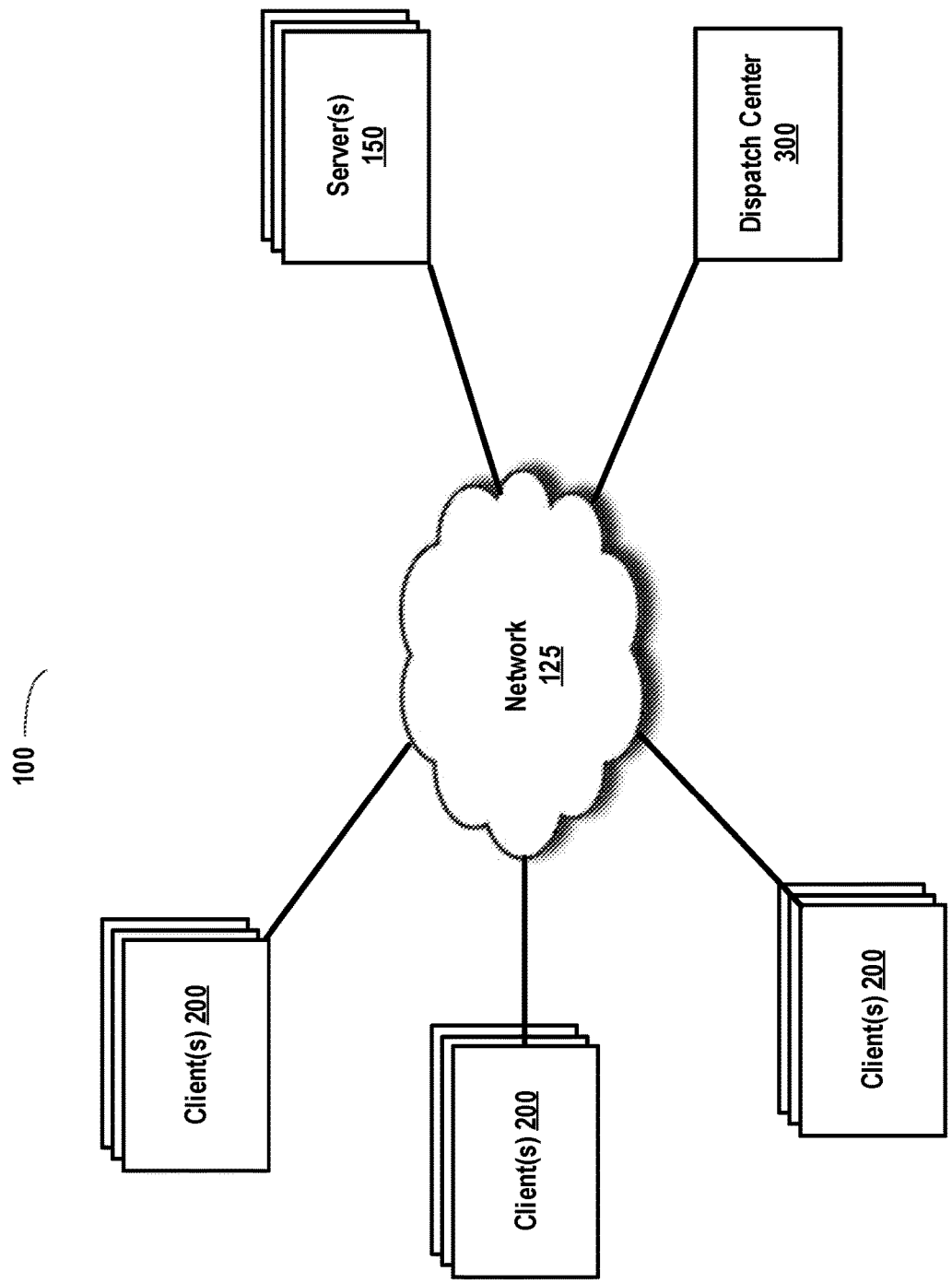
FIG. 1 illustrates, in block diagram form, a system for implementing unified distributed real-time quota limitation service, in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for establishing and enforcing quota limitations on shared resources used by client devices in a distributed networked system. Shared resources can be network bandwidth, CPU utilization, memory usage, storage usage, software usage, or any resource available on the distributed networked system that can be used to perform a task on behalf of the client device. A client device receives one or more policies that set a quota limit on usage of at least one resource of the distributed networked system, the at least one resource used in performance of a task for the client device. The quota limit can be based on the client device, specifically, or upon the client device being a member of a group of client devices. The client device receives a task to be performed that requires the use of the at least one resource. Such a task can be a backup operation of data from the client device to a backup server, or restoring one or more files to the client device from a remote storage. The task can be any task that requires usage of a shared resource in the distributed networked system. The client device can determine, before performing the task, how much of the at least will be used in performance of the task, and whether the amount to be used will exceed the quota limit for this client device. If so, then the client device can cancel performance of the task. In an embodiment, the client device can transmit a message indicating whether the task can, or will, be performed, or whether the task will be canceled due to exceeding the resource quota limit. For backup and restore operations, determining the amount of the resource to be used can include determining whether the data to be processed is currently deduplicated, or is raw data, and whether the backup or restore operation will transmit the data as deduplicated data or raw data, which affects the amount of data to be transferred over the network and the amount of CPU processing time and memory to be used in performing the task.

In another embodiment, a dispatch center can determine an amount of shareable resources available in a distributed networked environment. The dispatch center can determine, or receive via input, a plurality of resource quota limitation policies for groups of clients and/or for individual client devices. The dispatch center can transmit the applicable policies to each client in the distributed networked system, where the client devices will enforce shared resource usage quota limitation policies for reach shared resource. If, in the performance a task, a client device determines that it will exceed a quota limitation of a shared resource in the distributed network system, the client device may send a message accordingly to the dispatch center.

Any of the above methods can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

FIG. 1 illustrates, in block diagram form, a system 100 for implementing unified distributed real-time quota limitation service, in accordance with some embodiments. A distributed real-time quota limitation server can include one or more client devices 200 (collectively, or singularly, "client 200"), one or more servers 150 (collectively, or singularly, "server 150"), and a dispatch center 300, interconnected via a network 125.

Client 200 can be any type of computing system including a stand-alone computing device or a host computer running one or more virtual machines, with each virtual machine being a client 200. A stand-alone computing device can include a desktop computer, a laptop computer, a tablet computer, a wireless device, such as a cell phone, smart phone, personal digital assistant, television set-top box, smart watch or other computing device. Representative hardware capable of implementing client 200 is described below with reference to FIG. 8. As is known in the art, in a distributed networked system 100, client 200 can support sharing its computing resources. However, to better illustrate the inventive concepts described herein, client 200 resources will be described as not shared, and distinct from distributed networked system resources which are shared and whose usage by a client are subject to one or more policies that recite a quota limit for one or more system resources that are shared by clients 200. It is further understood that servers 150 and dispatch center 300 may not share all of their available resources. To ensure that servers 150 and dispatch center 300 can make progress on their own work loads, as well as client 200 workloads, a portion of potentially shareable resources may be kept reserved for servers 150 and dispatch center 300, while the greater portion of server resources are subject to sharing among clients 200, and subject to quota limitations. Representative hardware capable of running servers 150 and dispatch center 300 is described below with reference to FIG. 8.

Server 150 and dispatch center 300 can comprise multiple servers 150, storage appliances, network attached storage, raid arrays, and other devices that have shared resources. Server 150 can include management console server (MCS) 150. MCS 150 can initiate a backup request to a client 200. Upon receiving the request from MCS, an agent in client 200 routes the backup request to a file system plug-in in client 200. The file system plug-in assists in generating the backup of client data to a data store server 150. The file system plug-in can also generate backup progress information that is transmitted to MCS 150 by a messaging agent in client 200. If a client 200 will exceed a shared resource usage quota limitation by performing a task, the messaging agent can notify MCS 150 to terminate the requested task.

In an embodiment, dispatch center 300 can be located in one or more servers 150. Shared resources can include storage, memory, networking resources, such as bandwidth, and processing resources, such as one or more hardware processors. Processors may include one or more central processing units (CPU), graphics processing units (GPA), field programmable gate arrays (FPGA), application specific integrated circuits (ASIC), parallel or pipelined processors, and the like. Memory can include random access memory (RAM), read-only memory (ROM), flash memory, static or dynamic memory, and other types of memory. Storage can include hard disks, compact-disk ROM drives, digital video disk drives, tape drives, raid array's, and other storage. Network hardware can include one or more network interface cards, for networks such as TCP/IP, Fiber Channel, FireWire, Universal Serial Bus (USB), token ring, or other type of networking hardware and/or protocol. Representative hardware for implementing a server 150 and a dispatch center 300 is described below with reference to FIG. 8.

Servers 150 can perform services to clients 200 and other servers 150 via network 125. Servers can include file servers, backup/restore servers, print servers, fax servers, email servers, instant messaging servers, deduplication servers, and other services. Resources of servers 150 are generally shared with clients 200, but some amount of a server's resources will not be shared and may be reserved by the server 150 to perform core functionality of the server.

Figure 2:
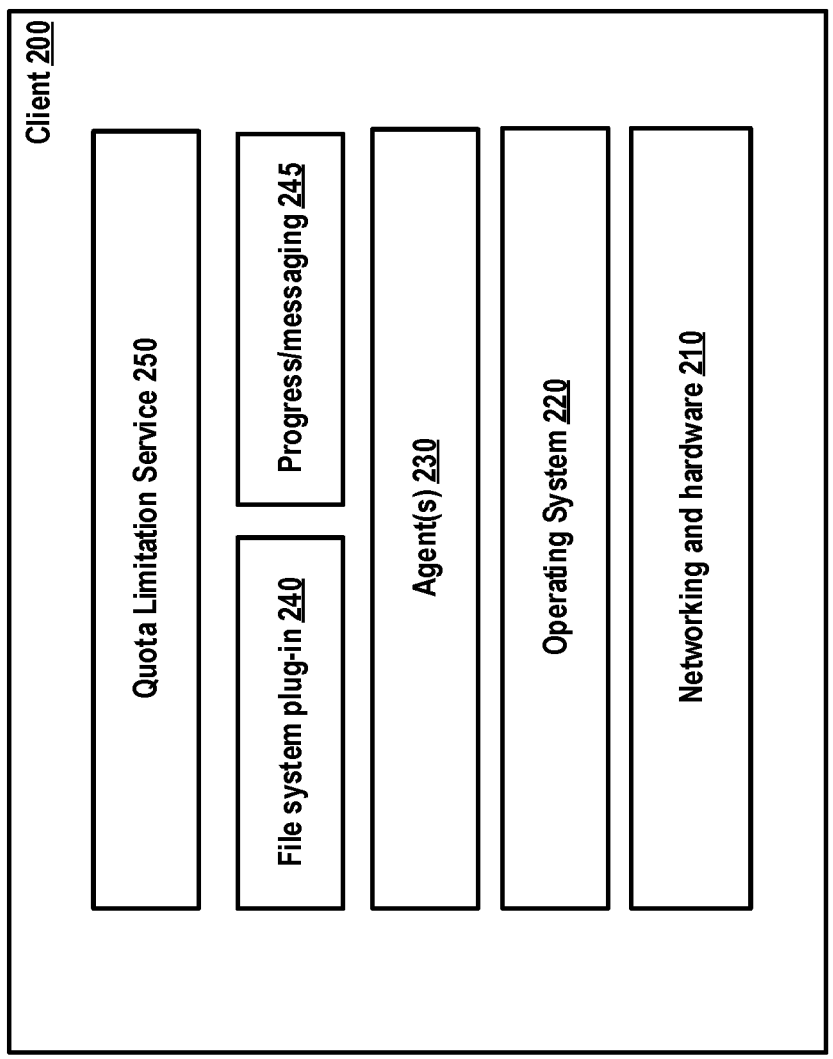
FIG. 2 illustrates, in block diagram form, a client device in a system for implementing unified distributed real-time quota limitation service, in accordance with some embodiments.

FIG. 2 illustrates, in block diagram form, a client device 200 in a system 100 for implementing unified distributed real-time quota limitation service, in accordance with some embodiments. Client 200 can include networking and hardware 210, operating system 220, agent(s) 230, file system plug-in(s) 240, messaging 245, and a quota limitation service 250. Other well-known features of a client 200 have been omitted, such as one or more user applications, a user interface, and the like.

As described with reference to FIG. 1 above and FIG. 8 below, client 200 can include networking and hardware resources 210. Client 200 can also include one or more operating systems 220, such as Windows, Unix, Linux, Apple OSX, or other operating system. Client 200 can include a virtualization software (not shown), such as VMWare. In such an embodiment, client 200 can comprise a virtual machine, having virtual network interface cards, and other virtualized computing hardware or software services (not shown).

Client 200 can further include one or more agent(s) 230. Agent(s) 230 can expose client 200 functionality to servers 150 or dispatch center 300. Agents 230 can perform platform-specific processes that run on a client 200 and can communicate with a management console server 150 (MCS) to carry out tasks that may originate from the distributed networked system 100 or may otherwise utilize shared resources of the distributed networked system 100.

Upon receiving the request from MCS, an agent 230 in client 200 routes the backup request to a file system plug-in 240 in client 200. The file system plug-in 240 assists in generating backup and/or restore of client 200 data to/from a data store server 150. The file system plug-in 240 can determine, by a recursive traversal of a file system, a size in bytes of each target directory and/or file specified in a backup or restore task for the client 200. Determining the size of a file system is described in more detail with reference to FIG. 7, below. In determining a number of bytes in a client file system task, file system plug-in 240 can take into account whether the file data to be backed up/restored is currently deduplicated, or is raw data, and whether the data is to be transferred over the network to/from the client 200 and server 150 as deduplicated data or raw data. By doing so, file system plug-in 240 can very accurately determine how much network bandwidth and storage space of the distributed networked system will be used in performing the task. The file system plug-in 240 can thus determine, before performing the task, whether a quota limitation will be exceeded for a shared resource of the distributed network system 100. If so, agent 230 can cancel the task via a message to MCS 150. The file system plug-in 240 can also generate backup progress information that is transmitted to MCS 150 by a messaging agent 245 in client 200.

Quota limitation service 250 can enforce quota limits, received from dispatch center 300, of the client 200 use of shared resources of the distributed networked system 100. As described below, with reference to FIG. 3, dispatch center 300 can determine an amount of each available shared resource in the networked distributed system 100. Quota limitation service receives quota limitations for shareable resources from dispatch center 300. When client 200 receives a task to perform that requires shareable resources, then one or more agents 230 or plug-ins 240 can determine the amount of shareable resources necessary to perform the task. Before the task is actually performed, quota limitation service can receive the amounts of shareable resources needed to perform the task, compare the amounts needed against one or more shareable resource quota limits received from the dispatch center 300, and determine whether any of the amounts of the required shareable resources exceeds a quota limitation for the shareable resource. If so, then quota limitation service 250 can cause progress/messaging 245 to send a message to dispatch center 300 or server 150 that requested the task be performed, notifying the dispatch center or server that performing the task will exceed one or more shareable resource quota limitations, and that the task will not be performed. Quota limitation server 250 can than cancel execution of the task on the client 200. By determining shareable resource utilization before a task is performed, and determining that a resource utilization quota will be exceeded by performing the task, a substantial amount of shareable resource utilization can be saved.

Figure 3:
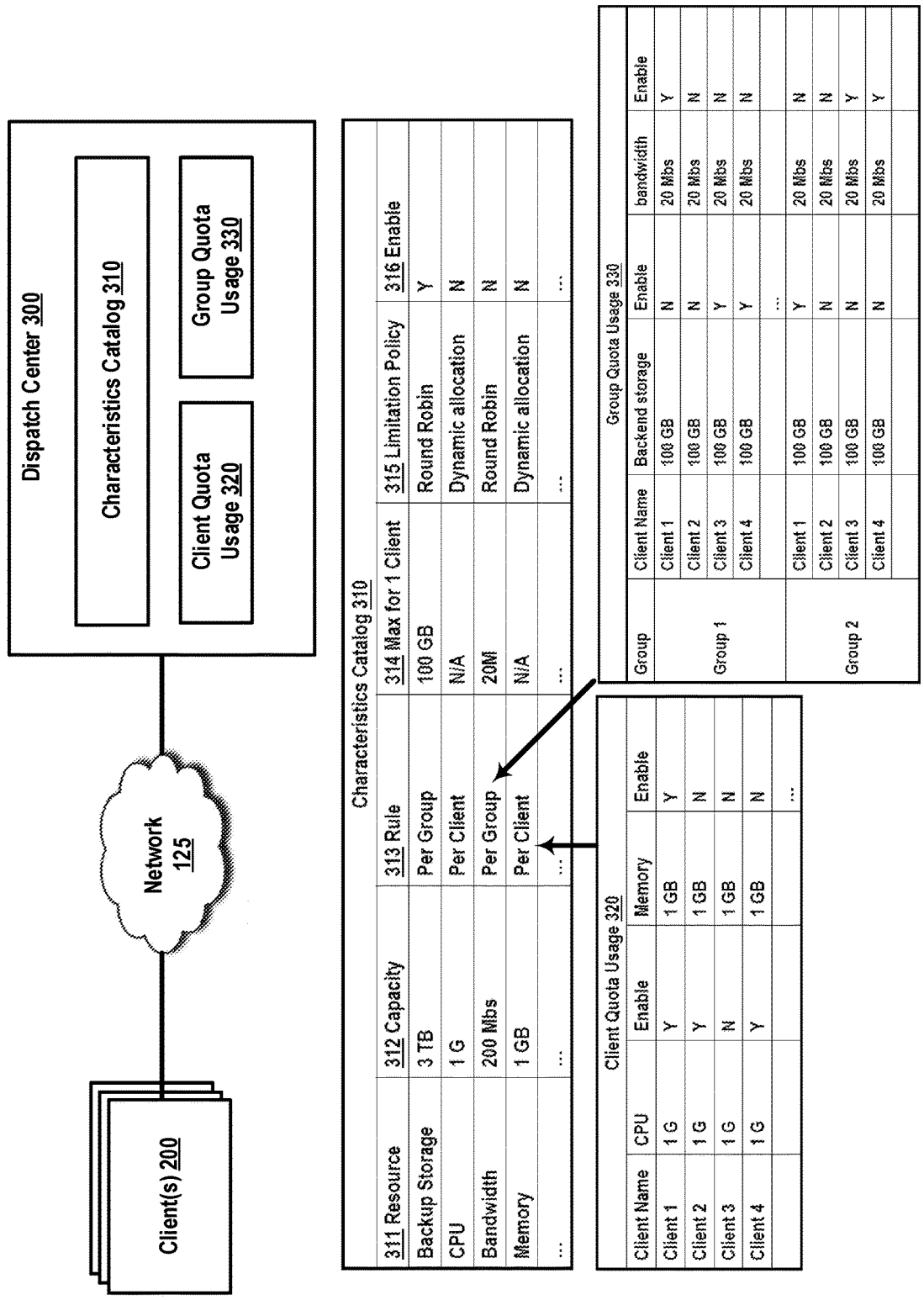
FIG. 3 illustrates, in block diagram form, a dispatch center in a system for implementing unified distributed real-time quota limitation service, in accordance with some embodiments.

FIG. 3 illustrates, in block diagram form, a dispatch center 300 in a system for implementing unified distributed real-time quota limitation service, in accordance with some embodiments. As illustrated in FIG. 1, and repeated here in FIG. 3, clients 200 can communicate with dispatch center 300, and servers 150 (not shown in FIG. 3), via network 125.

Dispatch center 300 determines the available shared resources of servers 150 in the distributed networked system 100. Dispatch center 300 also sends shared resource quota limitation rules to clients 200 in the distributed networked system 100. In an embodiment, one or more clients 200 can have resources that are also shared in the distributed networked system 100. Dispatch center 300 can also call one or more agents 230 in clients 200 to determine the shared resources of the clients 200. However, for ease of discussion, shared resources are described as being shared resources of servers 150 in the distributed networked system 100. However, it is understood that client 200 resources can be shared resources in the distributed networked system 100. In the following description, the term "device," alone, is used to mean "server" and/or "client," unless specified otherwise.

Dispatch center 300 can call an API, agent, or service within each device on the distributed networked system 100 to get an accounting of resources that are within the device, e.g. a server 150 or client 200. In an embodiment, the accounting received by dispatch center 300 for resources of the device can be limited to resources that the device has indicated are shareable on the networked distributed system 100. In an embodiment, the accounting of resources can include resources of the device that indicate both total device resources and shareable device resources. Dispatch center 300 can determine, from the accountings of each device in the distributed networked system 100, a total amount of shareable resources available use on the distributed networked system 100.

Dispatch center 300 can also receive, or determine, one or more policies that are used to establish quota limitations on shared resources of the distributed networked system 100. Group policies can determine quota limitations on a group of clients 200 that are stored in a group quota usage 330. Client policies can determine quota limitations on individual clients 200 that are stored in client quota usage 320. Group and client policies can be entered manually by user input. Group and client policies can be determined by default algorithms or intelligent algorithms.

Dispatch center 300 can maintain a characteristics catalog 310 of shareable resources in the distributed networked system 100. Characteristics catalog 310 can include a list of shareable resources 311, a capacity 312, or amount of each resource, a maximum quota 314 that can be allocated to each client 200, a limitation policy 315, such as round robin allocation or dynamic allocation of a shareable resource, and an enable flag 316 indicated that a limitation policy 315 is in force.

Client quota usage 320 and group quota usage 330 can be determined by the dispatch center 300 using an algorithm, or determined by user input of group or client policies, or a combination of these. In an embodiment, a default algorithm can determine a total amount of shareable resources on the distributed networked system 100 and can be evenly divide the shareable resources by the number of clients 200 configured on the system 100. This information can be used to populate client quota usage 320. Clients 200 that are grouped, such as by company, or department, or functionality, or other grouping, can be aggregated into groups, e.g. group 1, group 2, etc. as shown in group quota usage 330. Alternatively, or in addition, user input into group quota usage 330, or a policy that governs group quota usage 330, can specify shareable resource quota limitations for each client 200 in each group, and client quota usage 320 can be populated from group quota usage 330 information. Client quota usage 320 and group quota usage 330 can be used to populate characteristics catalog 310. In an embodiment, client quota usage 320 and group quota usage 330 can supplement one another to form a complete set of quota limitations for a client 200. For example, client quota usage 320 can specify CPU and memory quota limitations, and group quota usage 330 can specify backend storage and network bandwidth limitations per client per group. In another embodiment, a complete set of quota limitations for all shareable resources can be generated for groups of clients in group quota usage 330, and in addition, clients 200 that do not belong to a group can have a complete set of quota limitations for all shareable resources for clients 200 that may not be members of a group of clients.

Dispatch center 300 can cause each client 200 to implement resource quota limitations by transmitting one or more quota limitation for shareable resources of the distributed networked system 100 to the client 200. As described above, with reference to FIG. 2, quota limitation server 250 on client 200 can receive the one or more quota limitations for shareable resources and can enforce these quota limitations. In many cases, the enforcement of a quota limitation for a shareable resource can occur prior to performing a task being performed by, or on behalf of, a client device 200 by canceling the executing of a task that has been determined before beginning the task, that executing the task will exceed quota limitations of one or more shareable resources.

Figure 4:
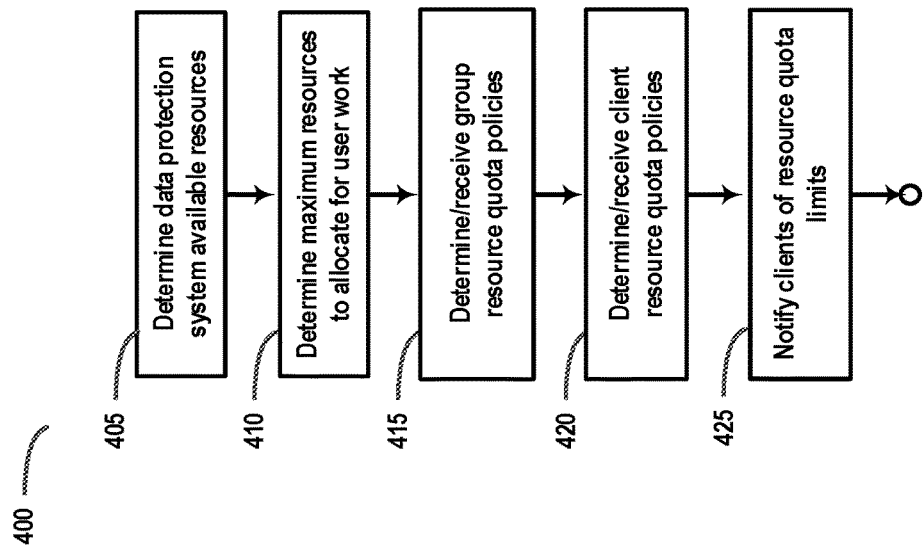
FIG. 4 illustrates, in block diagram form, a method of a dispatch center determining, and distributing, client resource quotas in a system using unified distributed real-time quota limitation service, in accordance with some embodiments.

FIG. 4 illustrates, in block diagram form, a method 400 of a dispatch center 300 determining, and distributing, client resource quotas in a system using unified distributed real-time quota limitation service, in accordance with some embodiments.

In operation 405, dispatch center 300 can determine a total amount of available shareable resources in the distributed networked system 100 for implementing real-time quota limitation. Available system resources can include all resources of servers 250 connected to the distributed networked systems. In an embodiment, available system resources can also include resources of a client 200. System resources can include storage, memory, processing power (generically, "CPU"), networking bandwidth, and other computing resources. To determine the system resources of each server 250 connected to the distributed network system 100, dispatch center 300 may call one or more application programming interfaces (APIs) or agents on each of the servers 150 in the distributed networked system 100.

In operation 410, dispatch center 300 can determine, from the available system resources determined in operation 405, a maximum amount of those system resources that will be shareable resources on the distributed networked system 100. Typically, this will be less than all of the resources determined in operation 405 because each server 150 needs to reserve some resources to itself to perform the work for which each server 150 is intended. Thus, not all of the storage, memory, CPU, or network bandwidth of a server 150 will be allocated as system resources to be used by clients 200.

In operation 415, dispatch center 300 can receive, or determine, one or more policies that set quota limitations of shareable resources clients 200 in a group of clients. A group of clients can be, for example, clients in a specified company or business, clients in a department in a business, clients in a specified network, clients in a specified geographic area, and other groupings of clients. In an embodiment, a specified network or geographic area may be known for very high traffic, thus a group policy may allocate a smaller amount of network bandwidth for each client in the group than is allocated for each client in another group. In embodiment, the group policy can be manually entered into dispatch center 300. In an embodiment, dispatch center 300 can obtain network bandwidth (or other resource) historic utilization information to determine shareable resource quota limitations for a group.

In operation 420, dispatch center 300 can receive, or otherwise generate, one or more shareable resource quota limitations for individual clients 200. In an embodiment, the policy can be received as user input to define a policy for a quota limitation for a resource for one or more clients. In an embodiment, a default policy can be used, e.g. by dividing the total amount of a shareable resource, less any amount of that resource that is otherwise quota-limited by a group policy, and dividing the remaining amount of the shareable resource by a number of available client devices.

In operation 425, dispatch center 300 can transmit one or more shareable resource quota limitation policies to one or more clients 200 in the distributed networked system 100. Logic implemented on each client 200, e.g. by quota limitation service 250 can enforce the quota limits in the policies transmitted to each client 200.

Figure 5:
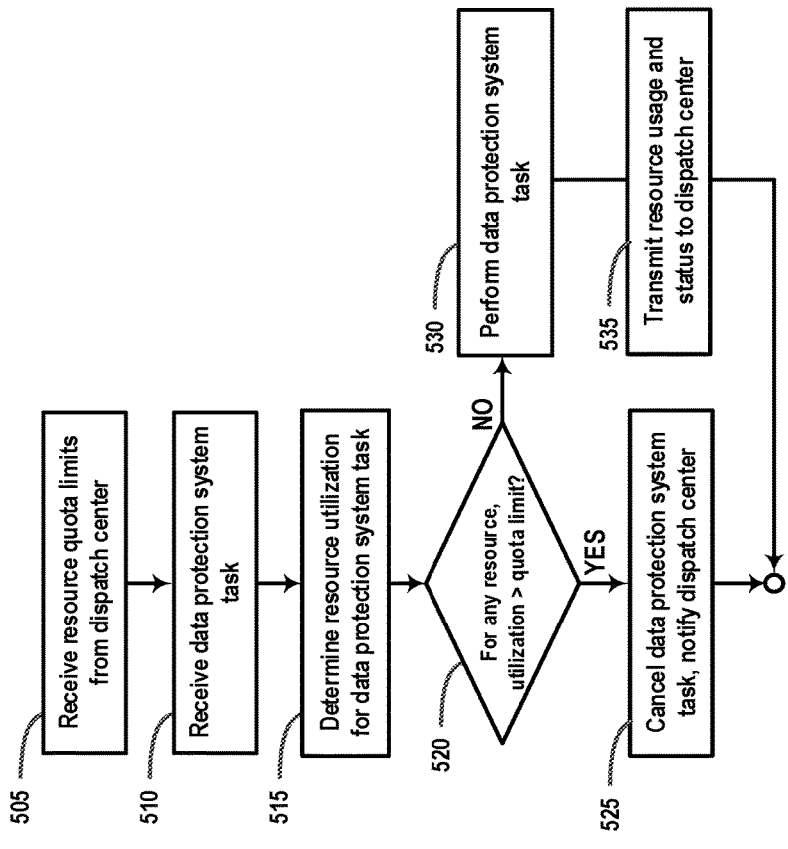
FIG. 5 illustrates, in block diagram form, a method of a client performing quota limitation enforcement in a system using unified distributed real-time quota limitation service, in accordance with some embodiments.

FIG. 5 illustrates, in block diagram form, a method 500 of a client performing quota limitation enforcement in a system using unified distributed real-time quota limitation service, in accordance with some embodiments.

In operation 505, client 200 can receive, from dispatch center 300, one or more quota limitation policies governing the client's usage of one or more shareable resources. The quota limitation policies can be received by, e.g., an agent 230, or messaging server 245, of the client device 200 and passed to the quota limitation service 250.

In operation 510, client 200 can receive a data protection task, such as a request to initiate a backup, initiate a restore, migrate a virtual machine, migrate a data set, or other task utilizes one or more shared resources of the distributed networked system 100. In an embodiment, the request for the task can be initiated by a server 150, such as a backup server 150. In an embodiment, the request for the task can be initiated by the dispatch center 300, or a messaging server 150 (not shown) that allocates tasks to clients 200 in a distributed networked system 100. In an embodiment, the request for the task can be initiated by the client 200 itself.

In operation 515, client 200 can utilize one or more a file system plug-ins 240, one or more agents 230, APIs, frameworks, or services of operating system 220 to determine the amount of shareable resources required to perform the requested task. In an embodiment, the requested task is migrating a virtual machine to another client 200, and the file system plug-in 240 of the source client 200 can determine the total amount of shareable resources, e.g. data storage, processing power, and network bandwidth, necessary to migrate the virtual machine to a destination. Agent 230, or file system plug-in 240, can pass to the quota limitation service 250, a total amount of shareable resources necessary to perform the task that was received in operation 510. Operation 515 can be performed before the task begins utilizing the shareable resources.

In operation 520, it can be determined whether the amount of any of the shareable resources (determined in operation 515) necessary to perform the task (received in operation 510) exceeds a quota limitation for the shareable resource. Quota limitation service 250 can determine whether a quota limit for any of the shareable resources of the distributed networked system would be exceeded by performing the task. If a quota limit of a shareable resource would be exceeded by performing the task, then method 500 continues at operation 525, otherwise method 500 continues at operation 530.

In operation 525, quota limitation service 250 can call progress/messaging agent 245 to send a message to dispatch center 300, or other server 150 that requested that the client perform the task in operation 510, to cancel the requested task because running the task will exceed a quota limitation for a shareable resource. In an embodiment, the message can include further details, such as the nature of the requested task, the particular resource that will exceed its quota limitation if the task is performed, and/or details of utilization of all shareable resources that would be used in performing the task. Method 500 ends.

In operation 530, can perform the task received in operation 510. During the performance of the task, one or more agents 230, or file system plug-in 240, can monitor shareable resource usage and progress of the task.

In operation 535, one or more progress messages can be transmitted by progress/messaging agent 245 to the server 150 that requested the task, or to dispatch center 300, or both. Method 500 ends.

Figure 6:
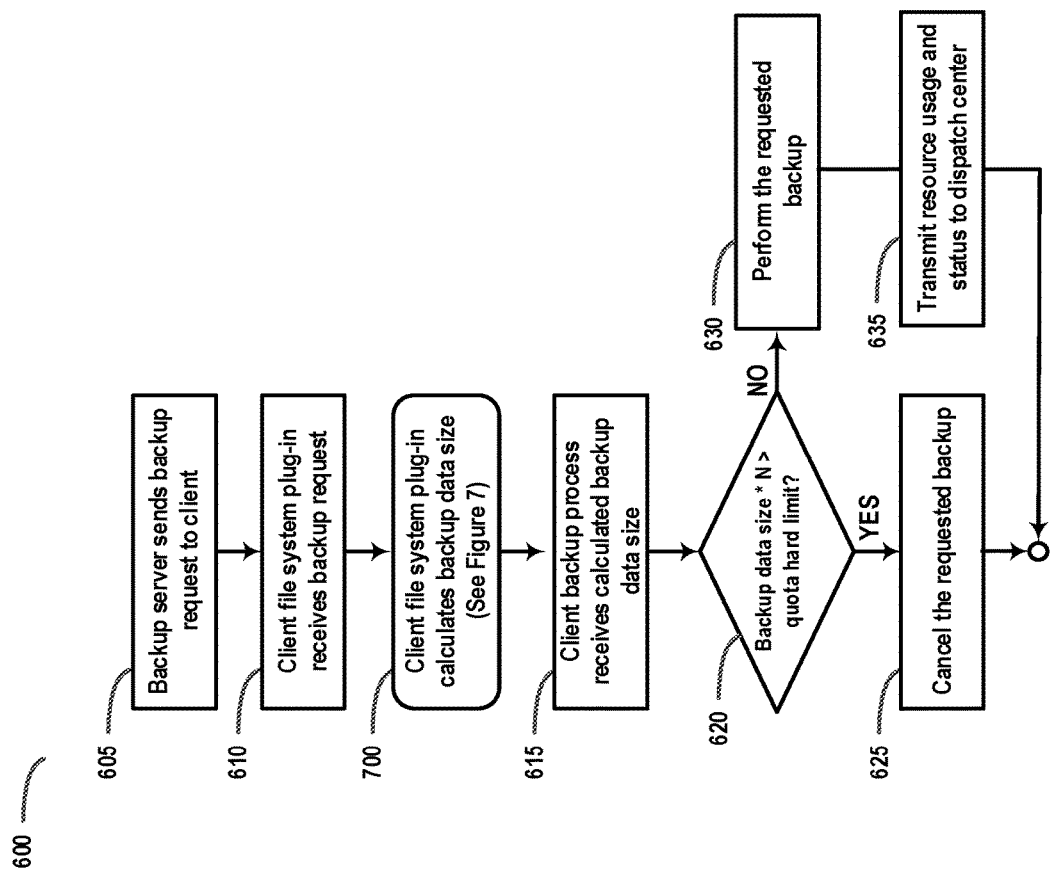
FIG. 6 illustrates, in block diagram form, a method of client performing quota limit enforcement, while performing a backup, in a system using unified distributed real-time quota limitation service, in accordance with some embodiments.

FIG. 6 illustrates, in block diagram form, a method 600 of client performing quota limit enforcement, while performing a backup, in a system using unified distributed real-time quota limitation service, in accordance with some embodiments.

In operation 605, client 200 can receive a data protection task, such as a request to initiate a backup, from a backup server 150. The data protection task utilizes one or more shared resources of the distributed networked system 100. In an embodiment, the request for the task can be initiated by the dispatch center 300, or a messaging server 150 (not shown) that allocates tasks to clients 200 in a distributed networked system 100. In an embodiment, the request for the task can be initiated by the client 200 itself.

In operation 610, client 200 can pass the request for a backup to file system plug-in 240. File system plug-in 240 can determine a total amount of data to be backed up to the backup server 150. In an embodiment, the data to be backed up may already be deduplicated, and the client 200 may wish to backup the data as raw data instead of deduplicated data. In such case, for each type of target data set to be backed up, e.g. email, database, etc., a raw data expansion factor, such as N=2 (50% compression due to deduplication), for transmitting raw data from deduplicated data can be applied by the file system plug-in 240 in determining the amount of resources that will be used in performing the backup. Similarly, if the data to be transmitted is currently stored as raw data, and the client 200 will back up the data as deduplicated data before transmitting the data to the backup server 150, then N=0.5 (50% deduplication factor) or other constant, per data set type, can be applied to accurately determine the amount of shareable resources that will be used to perform the backup. For a backup task, shareable resources may include network bandwidth to transmit the backup data, backend data storage to store the data received by the backup server 150, etc.

In operation 700, client 200 can utilize one or more a file system plug-ins 240, one or more agents 230, APIs, frameworks, or services of operating system 220 to determine the amount of shareable resources required to perform the requested task. Operation 700 is described more fully, below, with reference to FIG. 7. Operation 700 can be performed before the backup task begins utilizing the shareable resources.

In operation 620, it can be determined whether the amount of any of the shareable resources (determined in operation 700) necessary to perform the task (received in operation 605) exceeds a quota limitation for the shareable resource. Quota limitation service 250 can determine whether a quota limit for any of the shareable resources of the distributed networked system would be exceeded by performing the task. If a quota limit of a shareable resource would be exceeded by performing the task, then method 600 continues at operation 625, otherwise method 600 continues at operation 630.

In operation 625, quota limitation service 250 can call progress/messaging agent 245 to send a message to dispatch center 300, or other server 150 that requested that the client perform the task in operation 605, to cancel the requested task because running the task will exceed a quota limitation for a shareable resource. In an embodiment, the message can include further details, such as the nature of the requested task, the particular resource that will exceed its quota limitation if the task is performed, and/or details of utilization of all shareable resources that would be used in performing the task. Method 600 ends.

In operation 630, can perform the task received in operation 510. During the performance of the task, one or more agents 230, or file system plug-in 240, can monitor shareable resource usage and progress of the task.

In operation 635, one or more progress messages can be transmitted by progress/messaging agent 245 to the server 150 that requested the task, or to dispatch center 300, or both. Method 600 ends.

Figure 7:
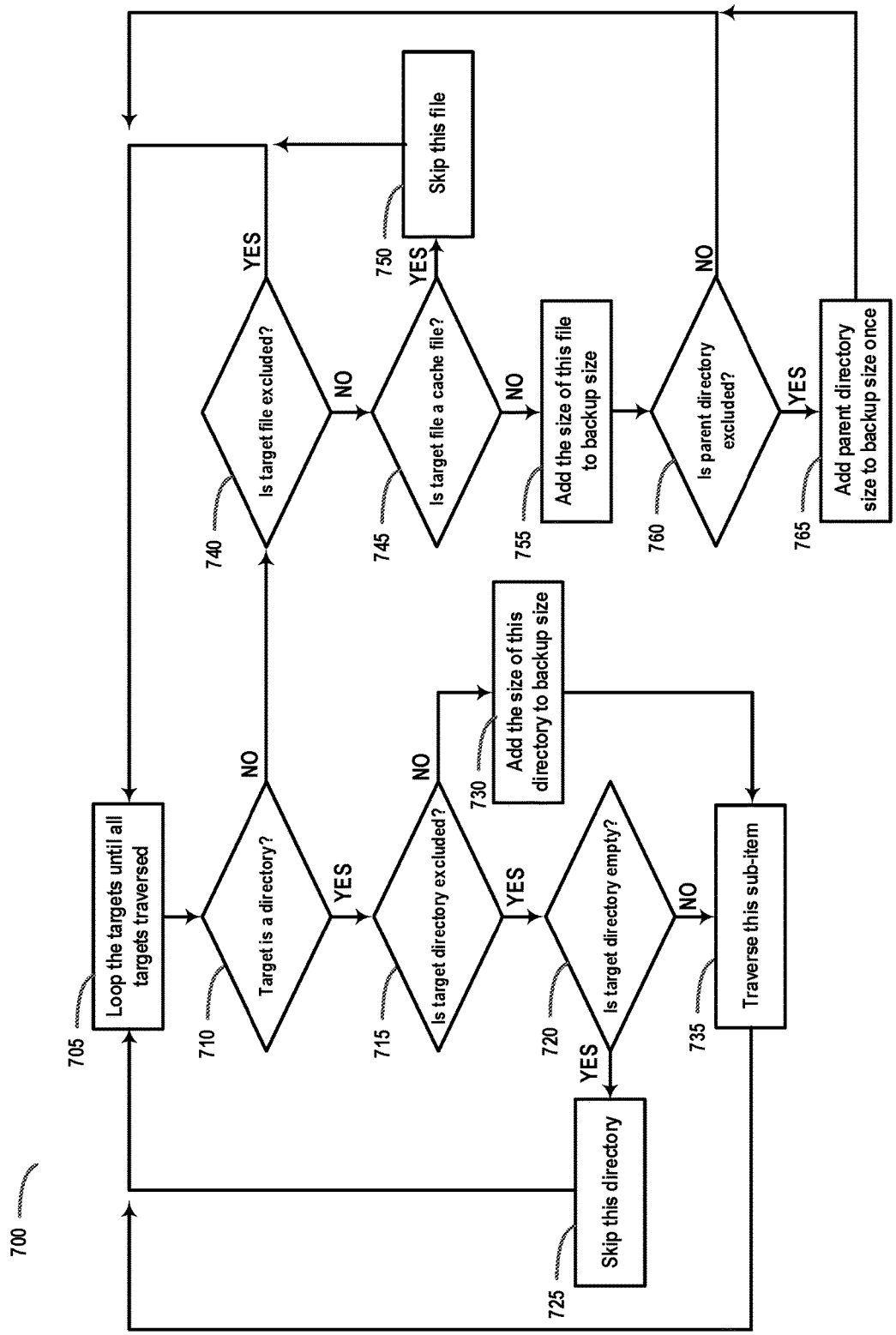
FIG. 7 illustrates, in block diagram form, a method determining a size of a backup in a system using unified distributed real-time quota limitation service, in accordance with some embodiments.

FIG. 7 illustrates, in block diagram form, a method 700 determining a size of a backup in a system using unified distributed real-time quota limitation service, in accordance with some embodiments. The size of the backup data will determine an amount of shareable resources, e.g. network bandwidth, backend data storage, etc. that will be necessary to perform the requested task. Method 700 can be used for backups, restores, migrating a virtual machine to another client/host 200, migrating a data set to another server 150, and other file-based operations. Method 700 traverses a file system on a client 200 to determine a total size of the data to be backed up, restored, or moved. Some data may be stored in deduplicated format, while other data is stored in raw format. A client 200 may have a policy that states that certain file operations, such as a backup, should be performed as raw data. Thus, method 700 may traverse data in a file system, and compute the traversed amount of data by applying a factor, N, to the traversed data, the value of N depending upon whether the data is currently compressed or raw, and whether the data is to be transmitted as compressed or raw. A value of N=1 means that the data will be transmitted in its current form. A value of N<1 means that raw data will be deduplicated or compressed before transmitted, and a value of N>1 means that deduplicated or compressed data will be transmitted as raw data. Specific values of N are based on empirical compression/decompression statistics for certain data set types. For example, text may compress to a higher degree than binary data, such as floating point numbers. So documents may have different values of N than spreadsheets, databases, or email, for example. Each target in the computation, below, can have a different value of N.

Initially, a total amount of data to be backed up is to zero. Method 700 will determine to the total amount of data to back and transmit over the distributed networked system 100 to backup server 150.

In operation 705, method 700 loops all targets specified in the scope of the backup request received by client 200 in, e.g., method 600, operation 605. A request to perform a backup may specify certain target directories or files, and also may specify directories or files to be excluded by from the backup. As described above, different values of N may be used depending upon the specific target data set to be backed up, and based upon whether the data is currently raw or compressed, and whether the data is to be transmitted in the backup as raw or compressed. When all targets in the file system have been considered for the backup size computation, or excluded from it, then method 700 ends.

In operation 710, it can be determined whether the target is a directory. If so, then method 700 continues at operation 715, otherwise method 700 continues at operation 740.

In operation 715, it can be determined whether the target directory was excluded in the received request for a backup. If so, then method 700 continues at operation 720, otherwise method 700 continues at operation 730.

In operation 720, it can be determined whether the excluded target directory is empty. If so then method 700 continues at operation 725, otherwise method 700 continues at operation 735.

In operation 725, the excluded target directory is empty, and is therefore skipped from the computation of the backup size. Method 700 loops back to operation 705 to consider a next target.

In operation 730, it has been determined that the target directory is not excluded, so the size of the directory is added to the backup size. Method 700 continues at operation 735.

In operation 735, the excluded target directory is not empty (has files) or is not excluded, and the target directory is traversed to determine the backup size of the files. Method 700 loops to operation 705 to process another target.

In operation 740, it is has been determined that the target is not a directory, and it is determined whether the target file is excluded. If so, then method 700 loops to operation 705 and another target is considered for the backup. Otherwise, method 700 continues at operation 745.

In operation 745, it is determined whether the included target file is a cache file. If so, then method 700 continues at operation 750, otherwise method 700 continues at operation 755.

In operation 750, the file is not excluded but is a cache file and is therefore skipped from the backup size computation. Method 700 loops to operation 705 and considers another target for the backup size.

In operation 755, the size of the included, non-cache, file is added to the backup size.

In operation 760, it is determined whether the parent directory is excluded as a target. If so, then method 700 loops to operation 705 and considers another target, otherwise method 700 continues at operation 765.

In operation 765, the parent directory size is added to the backup size once. A flag can be set so that the directory size is only added one time to the backup computation, no matter how many target files are in the directory.

Figure 8:
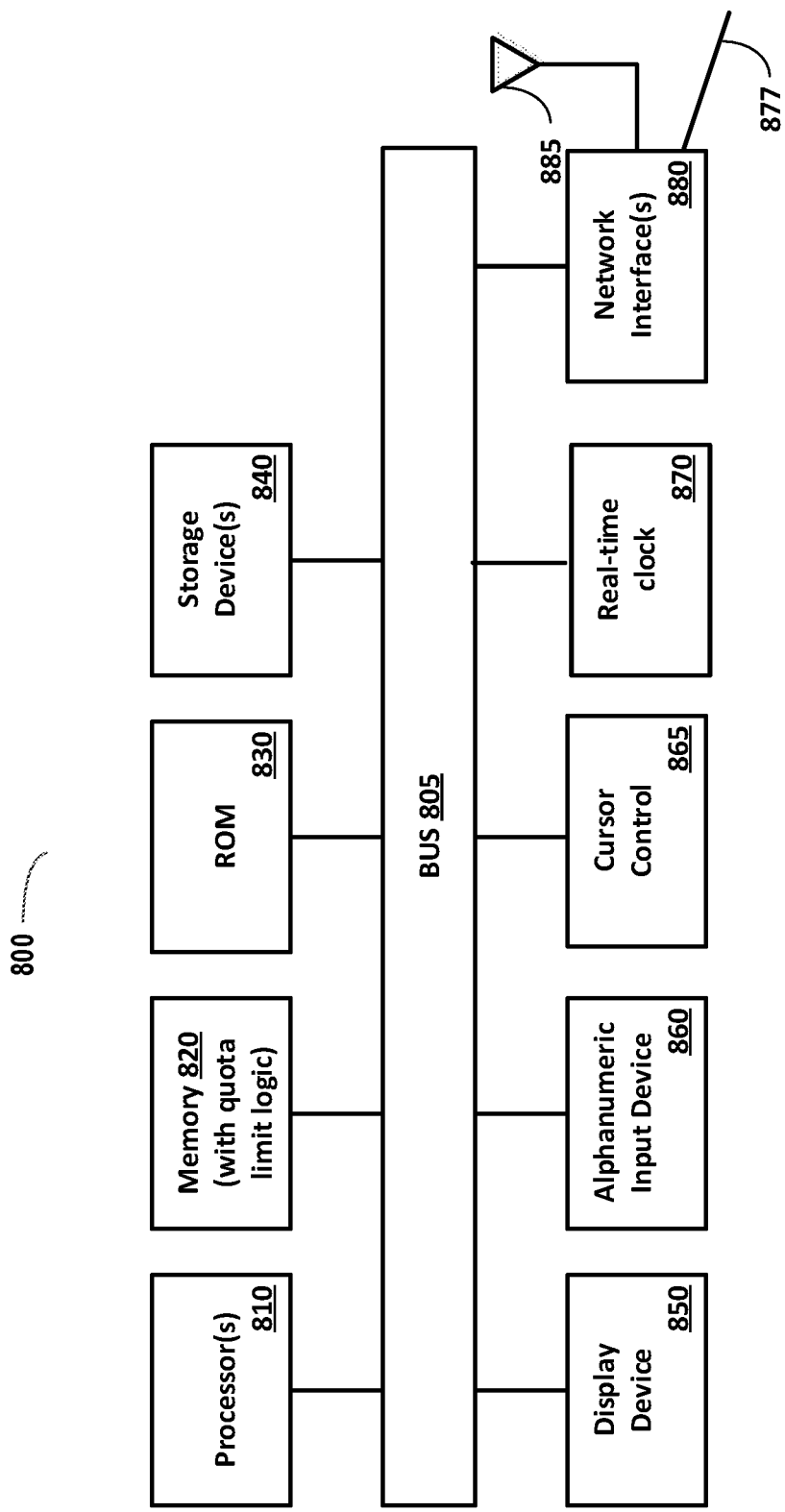
FIG. 8 illustrates, in block diagram form, a computing system that can be used to implement one or more portions of a system that implements unified distributed real-time quota limitation service, in accordance with some embodiments.

FIG. 8 is a block diagram of one embodiment of a computing system 800 that can be used to implement one or more portions of a system that implements unified distributed real-time quota limitation service, in accordance with some embodiments. The computing system illustrated in FIG. 8 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 8 may be used to provide a computing device and/or a server device.

Computing system 800 includes bus 805 or other communication device to communicate information, and processor 810 coupled to bus 805 that may process information.

While computing system 800 is illustrated with a single processor, computing system 800 may include multiple processors and/or co-processors 810. Computing system 800 further may include random access memory (RAM) or other dynamic storage device 820 (referred to as main memory), coupled to bus 805 and may store information and instructions that may be executed by processor(s) 810. Main memory 820 may also be used to store temporary variables or other intermediate information during execution of instructions by processor 810. Main memory 820 can further include executable programs, application programming interfaces (APIs), frameworks, and other executable program code to implement the RSA security logic described herein, and as detailed in at least FIG. 2, above.

Computing system 800 may also include read only memory (ROM) 830 and/or other static, non-transitory storage device 840 coupled to bus 805 that may store static information and instructions for processor(s) 810. Data storage device 840 may be coupled to bus 805 to store information and instructions. Data storage device 840 such as flash memory or a magnetic disk or optical disc and corresponding drive may be coupled to computing system 800.

Computing system 800 may also be coupled via bus 805 to display device 850, such as a light-emitting diode display (LED), liquid crystal display (LCD), or touch screen display to display information to a user. Computing system 800 can also include an alphanumeric input device 860, including alphanumeric and other keys, which may be coupled to bus 805 to communicate information and command selections to processor(s) 810. Another type of user input device is cursor control 865, such as a touchpad, a mouse, a trackball, or cursor direction keys to communicate direction information and command selections to processor(s) 810 and to control cursor movement on display 850. Computing system 800 may further include a real-time clock 870. The real-time clock 870 may be used for generating date/time stamps for data records, computing elapsed time, and other time-keeping functions. A real-time clock 870 can be a battery-backed chipset with a settable date and time. Alternatively, a real-time clock 870 may include logic to retrieve a real-time from a network source such as a server or an Internet server via network interfaces 880, described below. Real-time clock 870 can be used to determine a period for RSA token regeneration, such as 24 hours.

Computing system 800 further may include one or more network interface(s) 880 to provide access to a network, such as a local area network. Network interface(s) 880 may include, for example, a wireless network interface having antenna 885, which may represent one or more antenna(e). Computing system 800 can include multiple wireless network interfaces such as a combination of WiFi, Bluetooth® and cellular telephony interfaces. Network interface(s) 880 may also include, for example, a wired network interface to communicate with remote devices via network cable 887, which may be, for example, an Ethernet cable, a coaxial cable, a fiber optic cable, a serial cable, or a parallel cable.

In one embodiment, network interface(s) 880 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented comprising:
receiving, by a client device, one or more policies that set a quota on usage of at least one resource in a plurality of resources of a distributed networked system that are used in the performance of a task by the client device;
receiving, by the client device from a device in the distributed networked system, a task to be performed by the client device, wherein performing the task requires utilization of the at least one resource;
determining, by the client device, an amount of the least one resource that will be used in the performance of the task by the client device, the amount being determined based on a factor applied to data associated with the task, wherein the factor is determined based on a combination of a current state of the data and a transmission state of the data, the current state of the data and the transmission state of the data including compressed or raw;
in response to determining that the amount of the at least one resource that will be used to complete the task by the client device will exceed the quota in the one or more policies for the at least one resource, terminating the task by the client device; and
transmitting a message to the device of the distributed network system indicating that the client device has terminated the task, and indicating the at least one resource that will exceed its quota, and also the task will not be performed.

2. The method of claim 1, wherein the determining is performed before the at least one resource is used, and the plurality of resources of the distributed networked system exclude resources of the client device.

3. The method of claim 1, wherein the task is a backup of a data set from the client device to a backup server in the distributed networked system, and the at least one resource comprises one of: network bandwidth or disk storage.

4. The method of claim 3, further comprising, determining, before performing the backup:
an amount of raw data that comprises the backup, determined from a compressed version of the raw data; or
an amount of compressed data that comprises the backup, determined from a raw version of the data to be backed up.

5. The method of claim 1, further comprising:
in response to determining that the amount of the at least one resource needed for the client device to complete the task will not exceed the quota limit in the at least one policy for the at least one resource, performing the task by the client device.

6. A non-transitory computer-readable medium programmed with executable instructions that, when executed by a processing system having at least one hardware processor, perform operations comprising:
receiving, by a client device, one or more policies that set a quota on usage of at least one resource in a plurality of resources of a distributed networked system that are used in the performance of a task by the client device;
receiving, by the client device from a device in the distributed networked system, a task to be performed by the client device, wherein performing the task requires utilization of the at least one resource;
determining, by the client device, an amount of the least one resource that will be used in the performance of the task by the client device, the amount being determined based on a factor applied to data associated with the task, wherein the factor is determined based on a combination of a current state of the data and a transmission state of the data, the current state of the data and the transmission state of the data including compressed or raw;
in response to determining that the amount of the at least one resource that will be used to complete the task by the client device will exceed the quota in the one or more policies for the at least one resource, terminating the task by the client device; and
transmitting a message to the device of the distributed network system indicating that the client device has terminated the task, and indicating the at least one resource that will exceed its quota, and also the task will not be performed.

7. The medium of claim 6, wherein the determining is performed before the at least one resource is used, and the plurality of resources of the distributed networked system exclude resources of the client device.

8. The medium of claim 6, wherein the task is a backup of a data set from the client device to a backup server in the distributed networked system, and the at least one resource comprises one of: network bandwidth or disk storage.

9. The medium of claim 8, further comprising, determining, before performing the backup:

an amount of raw data that comprises the backup, determined from a compressed version of the raw data; or an amount of compressed data that comprises the backup, determined from a raw version of the data to be backed up.

10. The medium of claim 6, further comprising:

in response to determining that the amount of the at least one resource needed for the client device to complete the task will not exceed the quota limit in the at least one policy for the at least one resource, performing the task by the client device.

11. A system comprising:

a processing system having at least one hardware processor, the processing system coupled to a memory programmed with executable instructions that, when executed by the processing system, perform operations comprising:

receiving, by a client device, one or more policies that set a quota on usage of at least one resource in a plurality of resources of a distributed networked system that are used in the performance of a task by the client device;

receiving, by the client device from a device in the distributed networked system, a task to be performed by the client device, wherein performing the task requires utilization of the at least one resource;

determining, by the client device, an amount of the least one resource that will be used in the performance of the task by the client device, the amount being determined based on a factor applied to data associated with the task, wherein the factor is determined based on a combination of a current state of the data and a transmission state of the data, the current state of the data and the transmission state of the data including compressed or raw;

in response to determining that the amount of the at least one resource that will be used to complete the task by the client device will exceed the quota in the one or more policies for the at least one resource, terminating the task by the client device; and transmitting a message to the device of the distributed network system indicating that the client device has terminated the task, and indicating the at least one resource that will exceed its quota, and also the task will not be performed.

12. The system of claim 11, wherein the determining is performed before the at least one resource is used, and the plurality of resources of the distributed networked system exclude resources of the client device.

13. The system of claim 11, wherein the task is a backup of a data set from the client device to a backup server in the distributed networked system, and the at least one resource comprises one of: network bandwidth or disk storage.

14. The system of claim 13, further comprising, determining, before performing the backup:

an amount of raw data that comprises the backup, determined from a compressed version of the raw data; or an amount of compressed data that comprises the backup, determined from a raw version of the data to be backed up.

15. The system of claim 11, further comprising:

in response to determining that the amount of the at least one resource needed for the client device to complete the task will not exceed the quota limit in the at least one policy for the at least one resource, performing the task by the client device.

16. A system comprising:

a processing system having at least one hardware processor, the processing system coupled to a memory programmed with executable instructions that, when executed by the processing system, perform operations comprising:

determining an amount of a plurality of resources of a networked distributed system that are shared by a plurality of devices in the distributed networked system, the amount being determined based on a factor applied to data associated with the task, wherein the factor is determined based on a combination of a current state of the data and a transmission state of the data, the current state of the data and the transmission state of the data including compressed or raw;

determining a maximum amount of the plurality of resources that will be allocated to work performed on behalf of the plurality of devices in the distributed networked system;

receiving one or more resource utilization policies that set a quota for each of the plurality of resources for at least one client device of the plurality of devices, wherein the quota is limit on amount of the resource that the client device is permitted to use;

causing at least the client device to be configured to not exceed a quota in a resource utilization policy for at least one of the plurality of resources; and receiving, from the client device, an indication that, in performing a task, the client device has terminated the task and will exceed the quota for at least one of the resources, and receiving an indication that the client device will not perform a task.

* * * * *